United States Patent
Koyama et al.

(10) Patent No.: US 6,642,917 B1
(45) Date of Patent: Nov. 4, 2003

(54) SIGN PERCEPTION SYSTEM, GAME SYSTEM, AND COMPUTER-READABLE RECORDING MEDIUM HAVING GAME PROGRAM RECORDED THEREON

(75) Inventors: Naoyuki Koyama, Tokyo (JP); Shigeki Tooyama, Tokyo (JP)

(73) Assignee: Namco, Ltd., Tokyo (JP)

( * ) Notice: Subject to any disclaimer, the term of this patent is extended or adjusted under 35 U.S.C. 154(b) by 207 days.

(21) Appl. No.: 09/709,442

(22) Filed: Nov. 13, 2000

(30) Foreign Application Priority Data

Nov. 22, 1999 (JP) .......................... 11-330926

(51) Int. Cl.[7] ................................ G09G 5/00
(52) U.S. Cl. ...................... 345/156; 345/158; 463/36
(58) Field of Search ................. 345/156–158, 345/173–174; 463/36–39; 382/103, 203, 218

(56) References Cited

U.S. PATENT DOCUMENTS

| | | | |
|---|---|---|---|
| 4,267,443 A | | 5/1981 | Carroll et al. ............. 250/221 |
| 4,384,201 A | | 5/1983 | Carroll et al. ............. 250/221 |
| 5,288,078 A | * | 2/1994 | Capper et al. ............ 463/39 |
| 5,454,043 A | | 9/1995 | Freeman .................. 382/168 |
| 5,616,078 A | * | 4/1997 | Oh ........................ 463/8 |
| 5,704,836 A | * | 1/1998 | Norton et al. ............ 250/221 |
| 5,803,810 A | | 9/1998 | Norton et al. ............ 463/36 |
| 6,121,953 A | * | 9/2000 | Walker ................... 2/421 |
| 6,283,860 B1 | * | 9/2001 | Lyons et al. ............. 345/863 |

FOREIGN PATENT DOCUMENTS

| | | |
|---|---|---|
| JP | 57-211637 | 6/1981 |
| JP | 62-005428 | 1/1987 |
| JP | 02-171979 | 7/1990 |
| JP | 11-184618 | 12/1997 |
| JP | 2945870 | 1/1998 |
| JP | 11-213161 | 1/1998 |
| JP | 2849101 | 11/1998 |
| JP | 2941207 | 6/1999 |
| JP | 2000-245960 | 9/2000 |
| WO | WO 98/59312 | 12/1998 |
| WO | WO 99/50735 | 10/1999 |

OTHER PUBLICATIONS

Search Report, United Kingdom Patent Office, Jun. 22, 2001.

* cited by examiner

Primary Examiner—Richard Hjerpe
Assistant Examiner—Francis Nguyen
(74) Attorney, Agent, or Firm—Miles & Stockbridge P.C.; James T. Carmichael

(57) ABSTRACT

There is provided a game system which perceives a sign intended by a game player from the motion of a finger or hand of the player and controls the motions of game characters or the situation of a game in accordance with the sign. A game machine includes a received-light pattern detection apparatus for detecting the motion of a hand of a game player as a received-light pattern; a sign perception system for perceiving a sign from the received-light pattern input from the received-light pattern detection apparatus, and a main CPU for controlling a game in accordance with the sign perceived by the sign perception system.

7 Claims, 10 Drawing Sheets

FREEZE

FIRE

THUNDER

BARRIER

SIGN PERCEPTION SYSTEM, GAME SYSTEM, AND COMPUTER-READABLE RECORDING MEDIUM HAVING GAME PROGRAM RECORDED THEREON

BACKGROUND OF THE INVENTION

1. Field of the Invention

The present invention relates to a hand-input-type game system which controls game characters or the situation of a game without use of a keyboard or a joystick, to a sign perception system for use with the game system, and to a computer-readable recording medium having a game program recorded thereon.

2. Description of the Background Art

There has recently been proposed a game system for controlling the motion of game characters by means of perceiving hand gestures or body reactions of a game player in real time.

The present applicant has proposed a hand-input-type game system which perceives a sign from the motion of a hand or finger of a game player and which attacks an enemy character displayed on a game screen or controls the motions of game characters according to the input sign.

The hand-input-type game system proposed by the present applicant requires a received-light pattern detection apparatus which detects a received-light pattern corresponding to the position of a finger or hand of a game player on a two-dimensional planar surface formed on the front surface of a monitor and which can transport the thus-received received-light pattern to a video game board within a period of time shorter than a read interval of a video game.

The received-light pattern detection apparatus corresponds to a scanning manner apparatus in which photo-couplers, each consisting of a light-emitting diode and a light-receiving element, are two-dimensionally arranged at given intervals, thus constituting a detection plane. The light-emitting diodes are sequentially illuminated, whereby the light-receiving elements emit a light pattern to be received.

In a case where one hundred and twelve photo-couplers are provided on the front surface of a 29-inch monitor, since the time required for reading a received-light pattern from a single photo-coupler assumes a value of 200 μsec, a time of 22.4 msec. is required for reading received-light patterns from all the photo-couplers. This read time is longer than a read interval of a video game (i.e., 16.6 msec.)

The received-light pattern detection apparatus proposed by the present applicant is required to shorten a per-scan read time including a transfer time, so as to become less than the read interval of a video game.

Further, the received-light pattern detection apparatus proposed by the present applicant requires a sign perception system which detects the motion of a finger or hand of a game player from received-light pattern data in real time and perceives a sign intended by the game player from the thus-detected motion.

When manually entering signs, the game player does not always trace the detection plane with a single finger. For instance, there may be a case where the game player traces the detection plane with several fingers or with a hooked finger. In such a case, the coordinates of a point intended by the game player cannot be specified uniquely, and the received pattern data vaguely indicate a movement of the finger or the like, thus the apparatus cannot percept signs accord with intention of a game player.

SUMMARY OF THE INVENTION

The sign perception system must be able to uniquely specify the coordinates of a finger from a received-light pattern produced by the received-light pattern detection apparatus in order to perceive a sign intended by the game player without fail.

The present invention has been conceived in view of the foregoing drawbacks of the background art and is aimed at providing a game system which perceives a sign intended by a game player from the motion of a hand or finger of the game player and controls the motions of game characters or the scene of a game in accordance with the sign; a sign perception system for use with the game system; and a computer-readable recording medium having a computer program recorded thereon.

The above objects of the present invention are also achieved by a game system for controlling a game in accordance with a motion of a game player. The game system includes a received-light pattern detection apparatus for detecting the motion of the game player's hand as a received-light pattern. The game system also includes a sign perception unit for perceiving a sign from the received-light pattern input from the received-light pattern detection apparatus. The game system further includes a game control unit for controlling a game in accordance with the sign perceived by the sign perception unit.

The above objects of the present invention are also achieved by a computer-readable recording medium having recorded thereon a program for controlling a game in accordance with a motion of a game player. The program causes a computer to perform a sign perception function for perceiving a sign from a received-light pattern corresponding to the motion of a hand of the game player. The program also causes the computer to perform a game control function for controlling a game in accordance with the sign perceived by the sign perception function. The . . . includes.

The above objects of the present invention are also achieved by a sign perception system for perceiving a sign from received-light pattern data. The system includes a coordinate determination processing section for determining coordinates from the received-light pattern data. The system also includes an inclination computation processing section for detecting a straight line from the coordinate data determined by the coordinate determination processing section, thereby computing the inclination of the straight line. The system further includes a verification processing section for perceiving a sign by means of checking the inclination data computed by the inclination computation section against template data.

The above objects of the present invention are also achieved by a sign perception system for perceiving a sign from received-light pattern data. The system includes a coordinate determination processing section for determining coordinates from the received-light pattern data. The system also includes a data selection processing section for selecting the coordinate data determined by the coordinate determination section. An angle computation processing section is provided in the system for computing angle data from the coordinate data selected by the data selection processing section. An inclination computation processing section is also provided in the system for detecting a straight line from the angle data computed by the angle computation processing section, thereby computing the inclination of the straight line. The system further includes a verification processing section for perceiving a sign by means of checking the inclination data computed by the inclination computation section against template data.

The above objects of the present invention are further achieved by a computer-readable recording medium having recorded thereon a program for perceiving a sign from received-light pattern data. The program causes a computer to perform a coordinate determination function for determining coordinates from the received-light pattern data. The program also causes the computer to perform an inclination computation function for computing an inclination of a straight line from the coordinate data determined by the coordinate determination function. The program further causes the computer to perform a verification function for perceiving a sign by means of checking the inclination data computed by the inclination computation function against template data.

Other objects and further features of the present invention will be apparent from the following detailed description when read in conjunction with the accompanying drawings.

DESCRIPTION OF THE PREFERRED EMBODIMENTS

A preferred embodiment of the present invention will be described hereinbelow by reference to the accompanying drawings.

A game system according to an embodiment of the present invention is a hand-input-type game system which perceives a sign from the motion of a finger or hand of a game player and attacks enemy characters displayed on a game screen or controls th emotions of game characters in accordance with the input sign.

Figure 10:
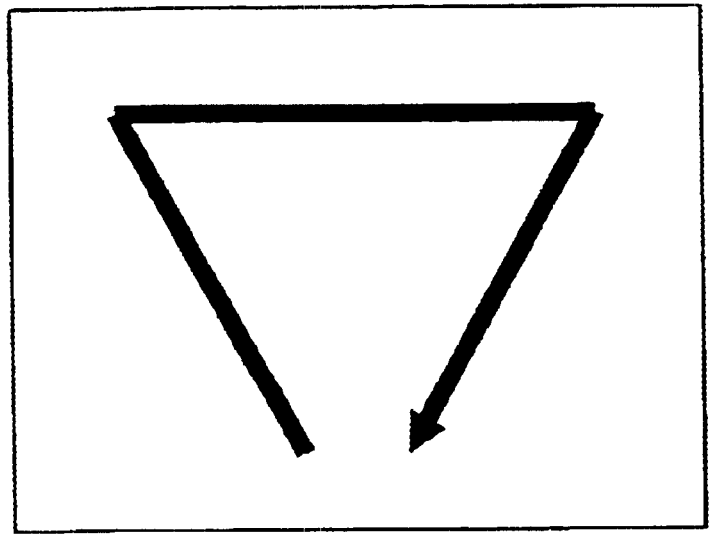
FIG. 10 is an illustration of a sign representing attack magic FREEZE.

Several example signs will first be described so as to explain the outline of an input operation to be performed by a game player before description of a received-light pattern detection apparatus according to the embodiment. FIG. 10 is an illustration of a sign representing "attack magic FREEZE." This sign is entered by means of a game player standing in front of a monitor 1 and moving his finger so as to link three straight lines by a single stroke. Thus, the game player sends a game system an instruction to practice magic of freezing attribute.

Figure 11:
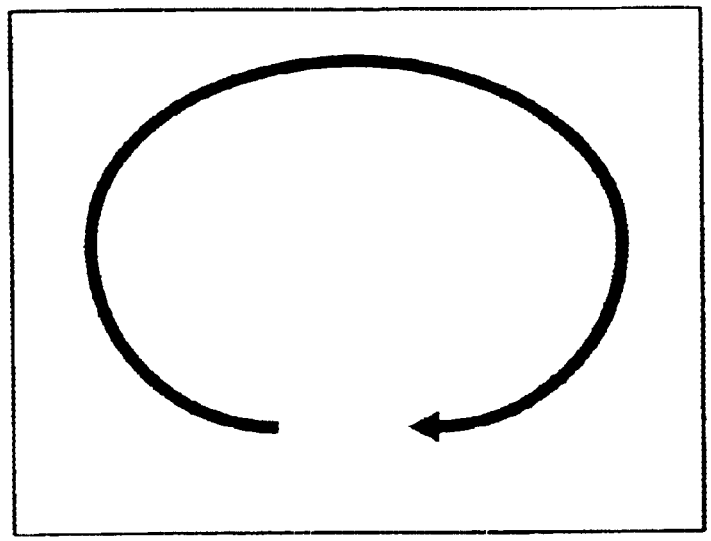
FIG. 11 is an illustration of a sign representing attack magic FIRE.

FIG. 11 is an illustration of a sign representing "attack magic FIRE." This sign is entered by means of a game player standing in front of the monitor 1 and tracing an oval figure with his finger. Thus, the game player sends the game system an instruction to practice magic of firing attribute.

Figure 12:
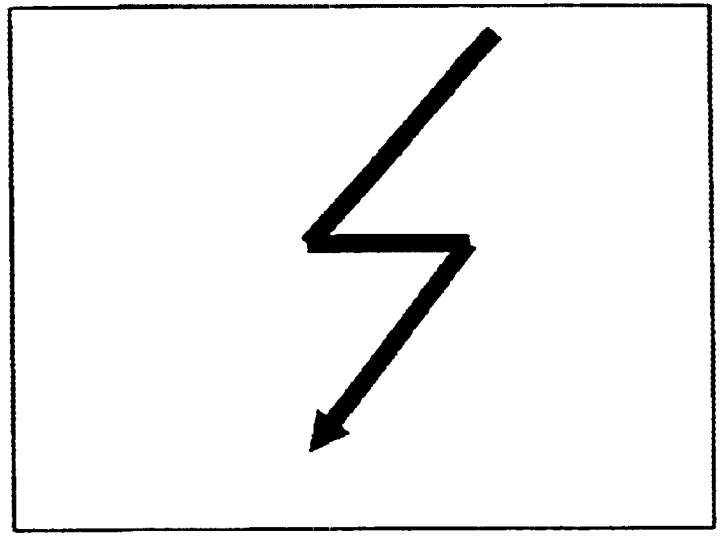
FIG. 12 is an illustration of a sign representing attack magic THUNDER.

FIG. 12 is an illustration of a sign representing "attack magic THUNDER." This sign is entered by means of a game player standing in front of the monitor 1 and moving his finger so as to link three straight lines as illustrated by means of a single stroke. Thus, the game player sends the game system an instruction to practice magic of thunder attribute.

After having entered a sign representing one of the types of attack magic described in connection with reference to FIGS. 10 through 12, the game player once moves his finger away and then specifies by his finger a target to be attacked. As a result, magic of attribute specified by entry of the sign is practiced on the target.

Figure 13:
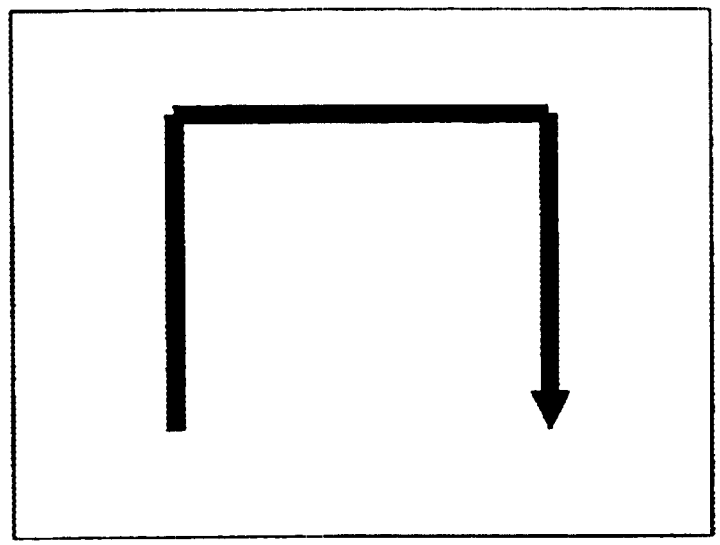
FIG. 13 is an illustration of a sign representing defense magic BARRIER.

FIG. 13 is an illustration of a sign representing "defense magic BARRIER." This sign is entered by means of a game player standing in front of the monitor 1 and moving his finger so as to link three straight lines as illustrated by means of a single stroke. Thus, the game player instructs setting up of a barrier in front of the character controlled by the game player.

Figure 1:
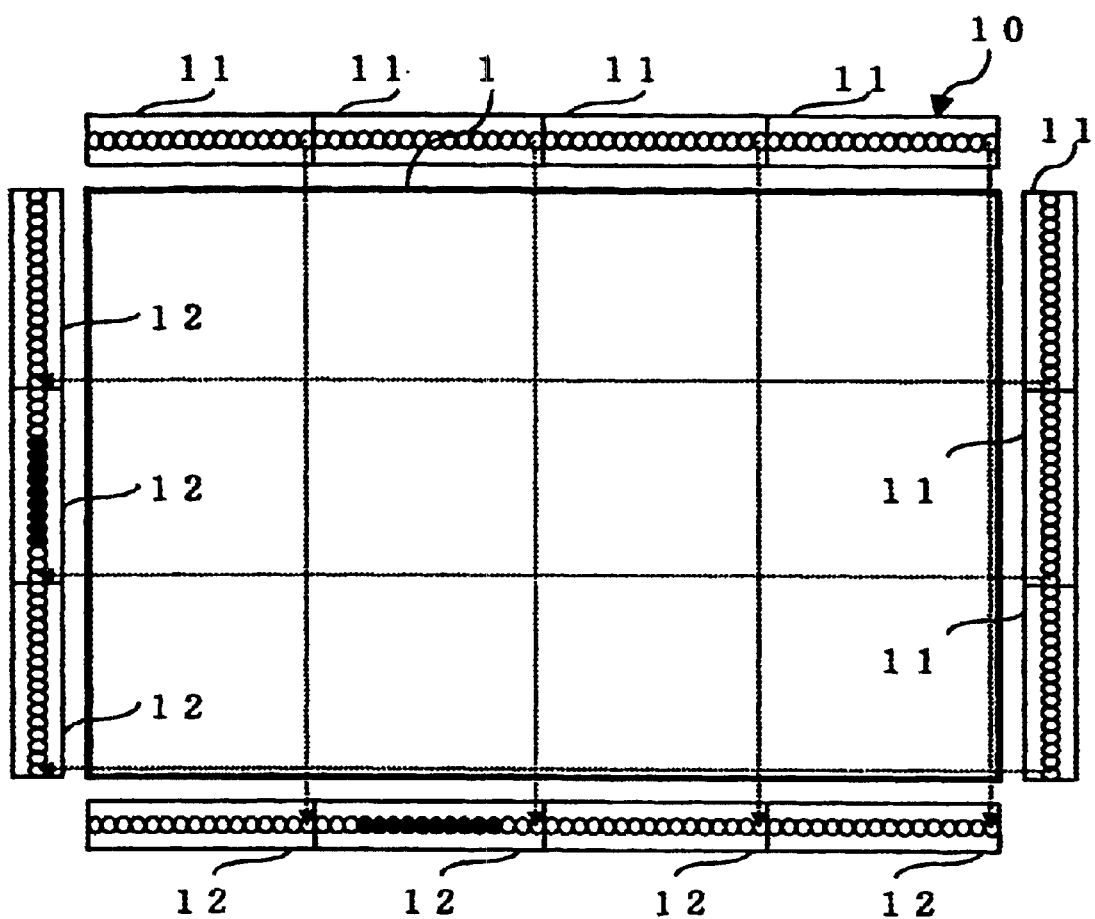
FIG. 1 is an illustration showing the received-light pattern detection apparatus when it is provided on a monitor.

The received-light pattern detection apparatus for detecting the entry of a sign performed by the game player will now be described by reference to FIG. 1. FIG. 1 is an illustration showing the received-light pattern detection apparatus when it is provided on a monitor 1.

The received-light pattern detection apparatus 10 traces, in a non-contact manner, the motion of a hand or finger of a game player standing opposite the monitor 1 as mentioned above and reads data pertaining to the coordinates of the player's finger during a read interval of a video game.

The received-light pattern detection apparatus 10 includes a circuit which comprises a plurality of light-emitting modules 11 connected to a plurality of light-receiving modules 12 through a cascade connection, and an I/O circuit (not shown). The circuit takes the states of respective photo-couplers included in those modules as one hundred and twelve. digital switch inputs for transmitting serial data by means of JV communication.

The I/O circuit is an I/O interface which converts the received-light pattern data to comply with a format for JV communication before transmitting thus converted data.

The received-light pattern detection apparatus 10 is formed on the front surface of the monitor 1 as shown in FIG. 1. Three light-emitting modules 11 are linearly provided in the vicinity of one shorter side of the front surface of the monitor 1 while three light-receiving modules 12 are linearly provided in the vicinity of the other shorter side of the front surface of the monitor 1. Further, four light-emitting modules 11 are linearly provided in the vicinity of one longer side of the front surface of the monitor 1 while four light-receiving modules 12 are linearly provided in the vicinity of the other longer side of the front surface of the monitor 1. The light-emitting modules 11 are arranged opposite the light-receiving modules 12, thereby constituting photo-coupler modules. The photo-coupler modules constitute a rectangular detection plane.

Since the monitor 1 has a 29-inch screen, the detection plane is formed to have a size sufficiently covering the 29-inch screen.

In the light-emitting module 11, 16 light-emitting diodes are arranged at an interval of 10.28 mm. In the light-receiving module 12, 16 light-receiving elements are arranged at an interval of 10.28 mm. The light-emitting diode emits light at the wavelength of an infrared ray.

The light-emitting modules 11 and the light-receiving modules 12 are arranged at an uniform interval of 10.28 mm for the following two reasons. First, there is ensured an interval for preventing occurrence of interference between infrared rays originating from the light-emitting diodes. Second, a human finger usually has a width of about 10 mm when the tip is pressed against a screen. In order to enable detection of the position of a finger on a planar surface formed over the front surface of the monitor 1, the interval between modules is made wider than the width of the human finger, thus detecting a single finger without fail through use of two sets of photo-couplers provided in both the longitudinal and lateral directions.

Figure 2:
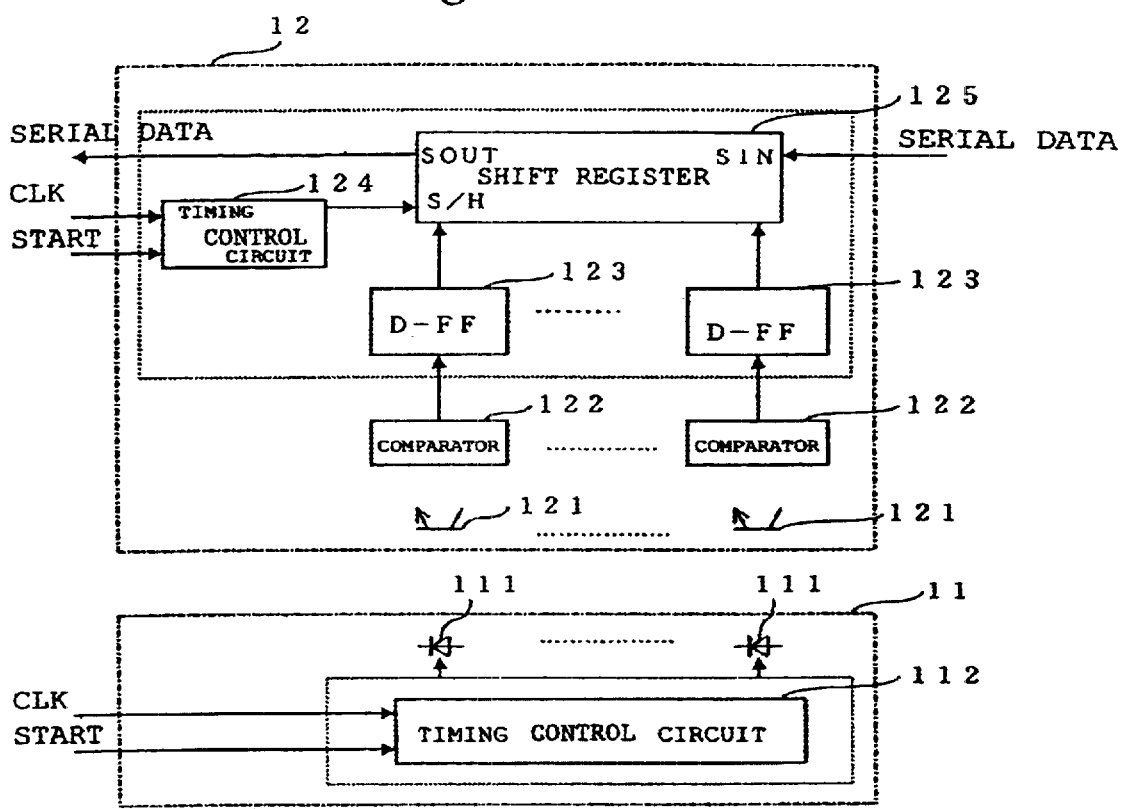
FIG. 2 is a block diagram showing the circuit configuration of a photo-coupler module.

The circuit configuration of the received-light pattern detection apparatus 10 according to the present embodiment will now be described by reference to FIG. 2. FIG. 2 is a block diagram showing the circuit configuration of a photo-coupler module.

As mentioned above, each photo-coupler module consists of the light-emitting module 11 and the light-receiving module 12. As shown in FIG. 2. the light-emitting module 11 comprises sixteen light-emitting diodes 111 and a timing control circuit 112. As illustrated, the light-receiving module 12 consists of sixteen light-receiving elements 121, sixteen voltage comparators 122, sixteen D-FF elements 123, a read control circuit 124, and a shift register 125.

The operation of the received-light pattern detection apparatus 10 will now be described by reference to FIGS. 3A to 3K. FIGS. 3A to 3K are timing charts showing signals appearing in a photo-coupler module.

Figure 3A:
FIGS. 3A to 3K are timing charts showing signals appearing in a photo-coupler module.

FIG. 3A shows the timing of a start signal. Such a timing signal is delivered to the timing control circuit 112 of the light-emitting module 11 and to a timing control circuit 124 of the light-receiving module 12. Accordingly, the timing control circuit 112 and the timing control circuit 124 start operations simultaneously. Here, symbol CLK designates an operation clock signal to be sent to timing circuits 112 and 124.

Figure 3B:
Figure 3C:
Figure 3D:
Figure 3E:

FIGS. 3B to 3E show light-emission timings of the light-emitting diode 111. FIG. 3B shows the first light-emission timing at which the 1 st element is to be illuminated; FIG. 3C shows the light-emission timing at which the 2nd element is to be illuminated; FIG. 3D shows the light-emission timing at which the 15th element is to be illuminated; and FIG. 3E shows the sixteenth light-emission timing at which the 16th element is to be illuminated. The sixteen light-emitting diodes 111 provided in the photo-coupler module are sequentially illuminated at control timings shown in FIGS. 3B to 3E.

Figure 3F:
Figure 3G:
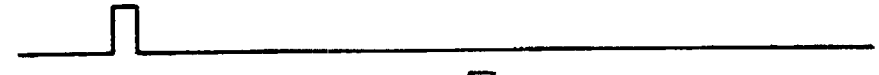
Figure 3H:
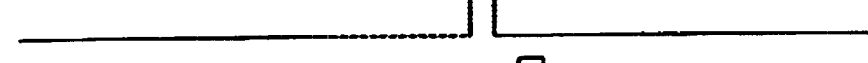
Figure 3I:
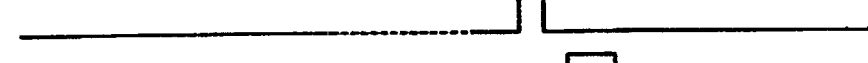

FIGS. 3F to 3I show latch timings of the light-receiving module 12. FIG. 3F shows the first latch timing at which data obtained from the amount of light emitted at the timing shown in FIG. 3B is latched; FIG. 3G corresponds to FIG. 3C, FIG. 3H corresponds to FIG. 3D; and FIG. 3I corresponds to FIG. 3E. The sixteen D-FF elements 123 latch a signal output from the light-receiving element 121 at timings shown in FIGS. 3F to 3I.

Figure 3J:

FIG. 3J shows the timing at which an S/H signal is to be output. The S/H signal is output at a point in time when the timing control circuit 124 has counted up sixteen CLK signals from the trailing edge of the start signal. The shift register 125 commences transfer of latch data at the output timing of the S/H signal.

Figure 3K:

FIG. 3K shows transfer of latch data. Upon receipt of the S/H signal shown in FIG. 3J, the shift register 125 transmits the latch data from an output terminal SOUT.

Up to this point the operation timing of the photo-coupler module has been described. A scan time for scanning a photo-coupler module in this embodiment is equal to the sum total of the time required for reading received-light pattern data from sixteen elements and the time required for transferring latch data. For instance, provided that the time required for reading received-light pattern data from a single element assumes a value of 200 $\mu$sec, the time required for read in g received-light pattern data from sixteen elements assumes a value of 3.2 msec. The sum total of a time of 3.2 msec and the time required for transferring sixteen latch data corresponds to a scan time for scanning a single photo-coupler module.

As mentioned previously, the light-emitting module 11 and the light-receiving module 12 are each divided into sixteen elements and the thus-divided elements are connected by a cascade connection so as to constitute a block. Accordingly, so long as the start signal shown in FIG. 3A is synchronized with a blanking signal, the received-light pattern detection apparatus 10 according to the present embodiment can transfer to a game board received-light pattern data corresponding to the two-dimensional coordinate data during the same time period as that required for scanning a single photo-coupler module. The received-light pattern detection apparatus 10 according to the present embodiment can reduce the read interval including a transfer time to a value of less than 16.6 ms.

Figure 4:
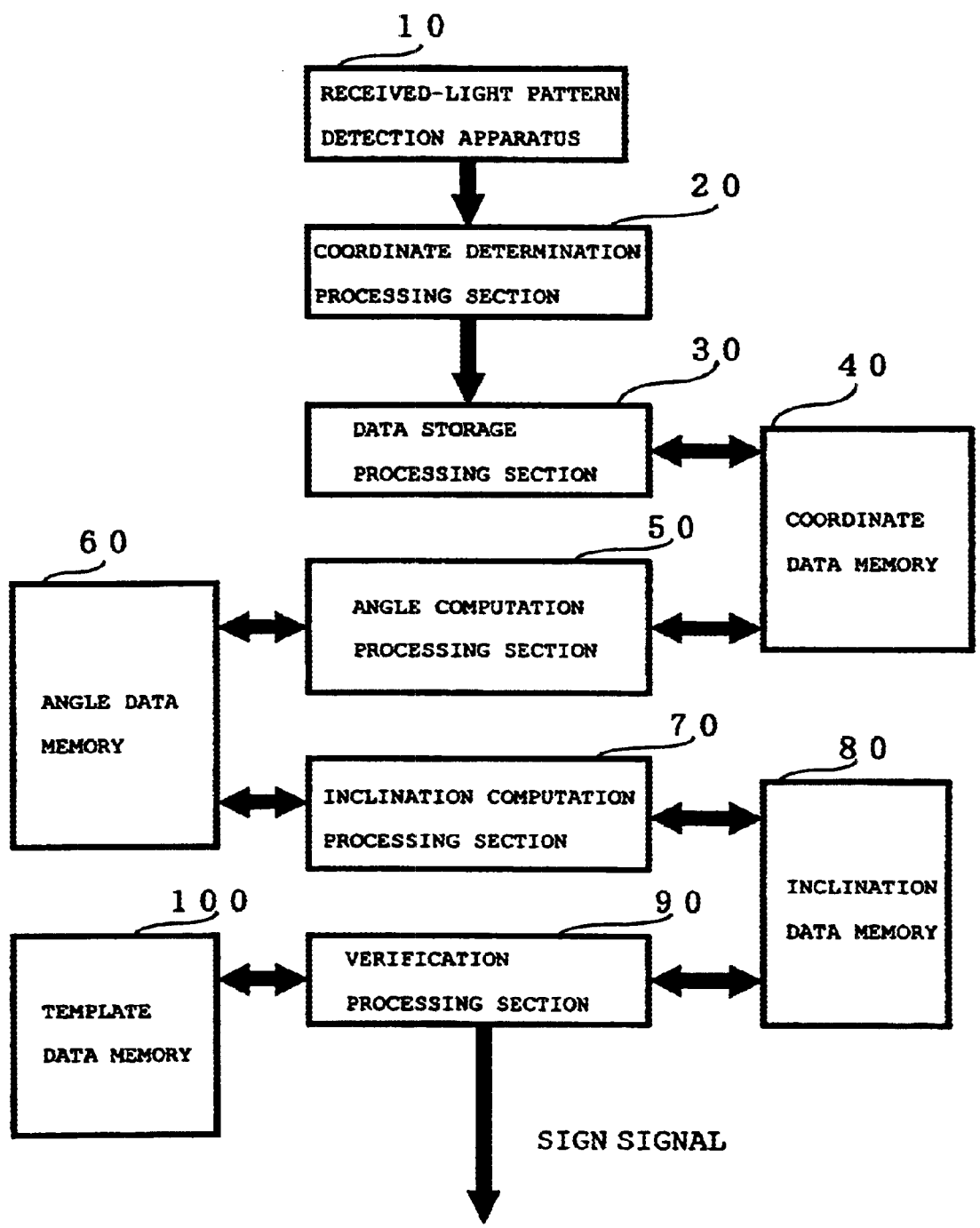
FIG. 4 is a block diagram showing a sign perception system according to an embodiment of the present invention.

The outline of a sign perception system according to the present embodiment will now be described. FIG. 4 is a block diagram showing a sign perception system according to the present embodiment.

The sign perception system is for perceiving a sign intended by a game player. The sign perception system includes a coordinate determination function for determining coordinates from received-light pattern data; a data selection function for selecting the coordinate data selected by the coordinate determination function; an angle computation function for computing angle data from the coordinate data selected by the data selection function; an inclination computation function for detecting a straight line from the angle data computed by the angle computation function and determining the inclination of the straight line; and a verification function for verifying a sign by means of checking the inclination data pertaining to a straight line computed by the inclination computation function against template data.

As shown in FIG. 4, the sign perception system comprises a coordinate determination processing section 20; a data storage processing section 30; coordinate data memory 40; an angle computation processing section 50; angle data memory 60; an inclination computation processing section 70; inclination data memory 80; a verification processing section 90; and template data memory 100. The outline of the respective sections will be described hereinbelow.

The coordinate determination processing section 20 corresponds to a processing section for implementing a coordinate determination function. The coordinate determination processing section 20 analyzes received-light pattern data entered during each interval, thereby determining coordinates.

The data storage processing section 30 implements a data selection function. The data storage processing section 30 selects coordinate data used for computing angle data from the coordinate data input by way of the coordinate determination section 20 and stores the thus-selected coordinate data into the coordinate data memory 40.

The coordinate data memory 40 is for storing coordinate data.

The angle computation processing section 50 is for implementing an angle computation function and detects the angle of movement of the game player's hand from adjacent coordinate data among the data read from the coordinate data memory 40.

The angle data memory 60 is for storing angle data computed by the angle computation processing section 50.

The inclination computation processing section 70 implements an inclination computation function. Among the angle data read from the angle data memory 60, the inclination computation processing section 70 detects angle data sets corresponding to straight lines and computes a mean value of the angle data sets. The averaged angle data set corresponds to the inclination of a straight line, and hence the averaged angle data set will hereinafter be called merely "inclination data."

The inclination data memory 80 is for storing the inclination data computed by the inclination computation processing section 70.

The verification processing section 90 implements a matching function. The verification processing section 90 checks inclination data against template data. A sign corresponding to the template data which have matched all the inclination data sets is perceived by the verification processing section 90 as a sign entered by the game player.

The template data memory 100 stores a plurality of template data sets for each sign. The template data include a value representing an inclination angle of a straight line, which value is of a hexadecimal digit to be described by reference to FIG. 7. For example, two types of data sets (a, 5, a) and (a, 3, a) are stored as template data representing "attack magic THUNDER." Further, a data set (e, 4, a) is stored as template data representing "attack magic FREEZE," and a data set (0, 4, 8) is stored as template data representing "barrier magic BARRIER."

Data sets (e, 2, 5, 8, b), (1, 3, 5, 9, a), (d, 1, 3, 6, a), (f, 3, 7, b), (1, 3, 7, b), and (d, 1, 4, 7, a, c) are stored as "attack magic FIRE." FIRE shown in FIG. 11 is entered in the form of a circle or oval pattern, as shown in FIG. 11. The reason why the template data to be checked against an input circle or oval pattern include a maximum of six inclination data sets is that the number of the inclination data sets which can be calculated is up to six since the moving direction of the game player's hand is not detected within an accuracy of 22.5° as shown above.

A coordinate determination function to be performed by the coordinate determination processing section 20 will now be described. For instance, in a case where the game player traces the detection plane of the received-light pattern detection apparatus 10 with his forefinger, received-light pattern data indicating that any one of the light-receiving elements arranged in the lateral direction and any one of the light-receiving elements arranged in the longitudinal direction are turned off are input to the coordinate determination processing section 20. From the received-light pattern data, a point on the detection plane is specified. The thus-specified point will be hereinbelow referred to as a "specified point."

The coordinate determination processing section 20 can uniquely determine, from the received-light pattern data, the coordinates of the specified point on the detection plane of the received-light pattern detection apparatus 10, which point is to be entered by the game player.

When manually inputting a sign, the game player does not always trace the detection plane of the received-light pattern detection apparatus 10 with a single finger. For example, there may be a case where the game player may trace the detection plane of the received-light pattern detection apparatus 10 with a plurality of fingers or with a hooked finger. Description will now be given with reference to FIG. 5 of processing for determining coordinates of the specified point from the received-light pattern data obtained from the received-light pattern detection apparatus 10.

Figure 5:
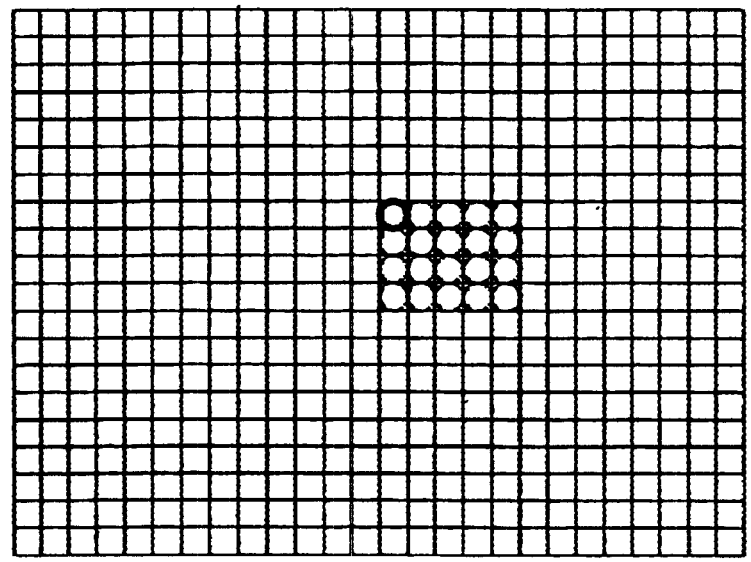
FIG. 5 is an example of received-light pattern data comprising 64 bits of data in the lateral direction and 48 bits of data in the longitudinal direction.

FIG. 5 is an example of received-light pattern data comprising 64 bits of data in the lateral direction and 48 bits of data in the longitudinal direction. The received-light pattern data are obtained when the game player has traced the detection plane of the received-light pattern detection apparatus 10 with his hand. The position of the game player's hand is detected within a wide range such as that shown in FIG. 5. Therefore, the coordinate determination processing section 20 cannot uniquely specify, from the received-light pattern data, the coordinates of a point at which the game player has entered a sign.

In connection with the received-light pattern data obtained when the game player's hand is detected within a wide range in the manner as mentioned previously, the coordinate determination processing section 20 handles the coordinates of the top left point shown in FIG. 5 as the coordinates of the point indicated by the forefinger of the game player.

The reasons for this are that the top left point corresponds to a position of the forefinger of right-handed game players who are the majority, while the photo-couplers are arranged such that any one of the light-receiving elements arranged in the lateral direction and any one of the light-receiving elements arranged in the longitudinal direction are turned off when a game player traces the detection plane with his forefinger.

As mentioned above, the coordinate determination processing section 20 according to the present embodiment determines the coordinates of the specified point on the detection plane at which a sign has been entered, from the received-light pattern data input from the received-light pattern detection apparatus 10 for each inter, even if the game player does not trace the detection plane of the received-light pattern detection apparatus 10 with a single finger.

A data selection function of the data storage processing section 30 will now be described. In order to detect the moving direction of the game player's hand at predetermined accuracy, the data storage processing section 30 selectively stores coordinate data pertaining to specified points arranged at predetermined intervals. Here, a predetermined interval means that each stored specified points are away from each other three or more points in both the lateral direction and the longitudinal direction. Here, three points corresponds to a value of about 30 mm on the detection plane formed on the received-light pattern detection apparatus 10. The data storage processing section 30 stores only the coordinate data corresponding to a point spaced 30 mm or more apart from the position corresponding to the coordinate data which have already been stored. The value of three points or more is determined empirically.

Figure 6:
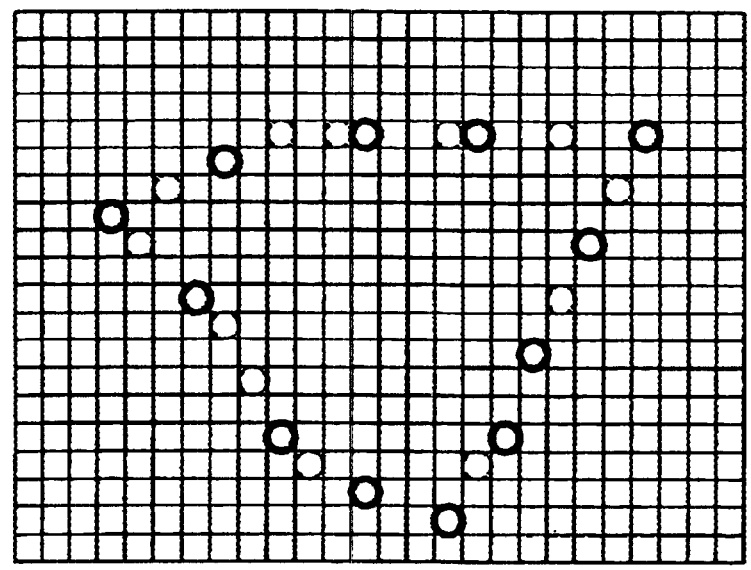
FIG. 6 is an illustration showing a data selection function.

FIG. 6 is an illustration showing a data selection function. Circles shown in FIG. 6 (including both solid circles and dotted circles) depict coordinate data obtained through the input coordinate determination processing operation. Solid circles depict coordinate data which have been determined to be stored in the data storage processing section 30. Dotted circles depict coordinate data which have been determined not to be stored in the data storage processing section 30. It can be seen that coordinate data indicated by a dotted circle are located within a range spaced 3 bits or less from the coordinate data indicated by a solid circuit.

Figure 7:
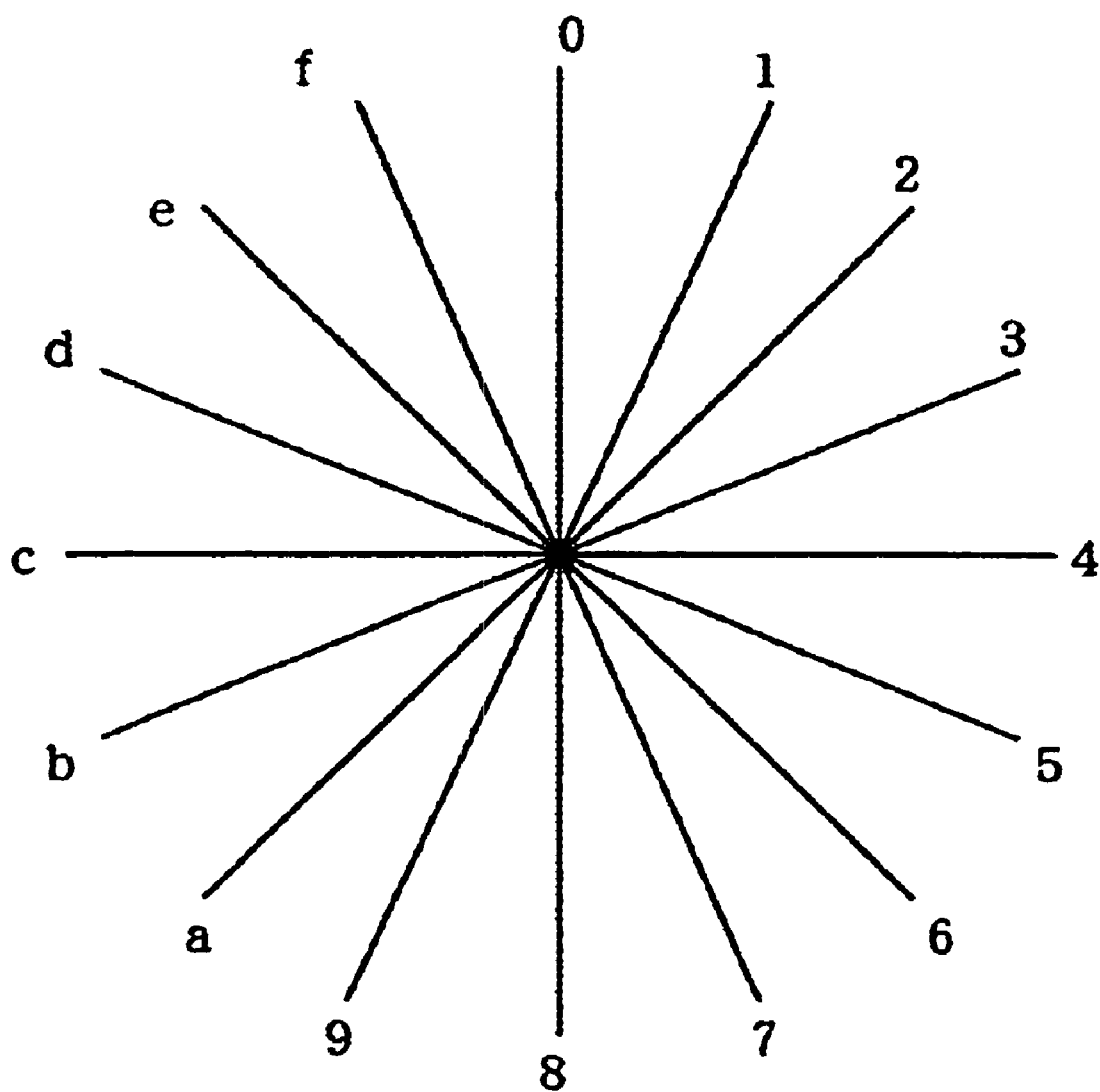
FIG. 7 is a graph for describing a method for approximating angle data.

The angle computation function of the angle computation processing section 50 will be described by reference to FIGS. 7 and 8. FIG. 7 is a graph showing angle data derived through use of an approximation method.

According to the approximation method shown in FIG. 7, a plane of 360° is divided into 16 sectors, each covering 22.5°. The graph shown in FIG. 7 has a scale of 0 to "f" expressed by a hexadecimal digit. 0 designates a value of 0°; 1 designates 22.5°; 2 designates 45°; 3 designates a value of 67.5°; 4 designates a value of 90°, 5 designates a value of 112.5°; 6 designates a value of 135°; 7 designates a value of 157.5°; 8 designates a value of 180°; 9 designates a value of 202.5°; "a" denotes a value of 225°; "b" denotes a value of 247.5°; "c" denotes a value of 270°; "d" denotes a value of 292.5°; "e" denotes a value of 315°; and "f" denotes a value of 337.5°. The accuracy of measurement performed according to such an approximation method (having a value of 22.5°) corresponds to the accuracy of calculation of an angle.

Figure 8:
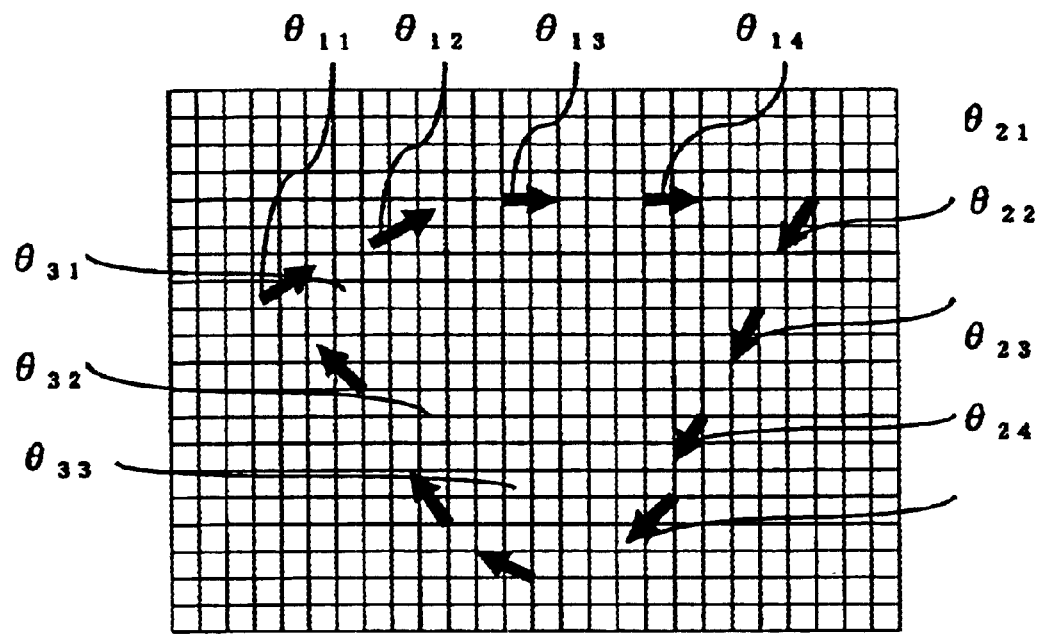
FIG. 8 is an illustration representing a path of movement of a game player's hand on the basis of the angle data.

FIG. 8 is an illustration representing the path of movement of the game player's hand on the basis of the angle data. The arrows shown in FIG. 8 schematically represent angle data based on the coordinates indicated by solid circles shown in FIG. 6. In order to prevent the length of an arrow from implying a meaning, illustrated arrows are indicated so as to assume the same length. FIG. 8 shows the trail of movement of the game player's hand through use of angle data. Up to this point the angle computation function to be performed by the angle computation processing section 50 has been described.

Figure 9:
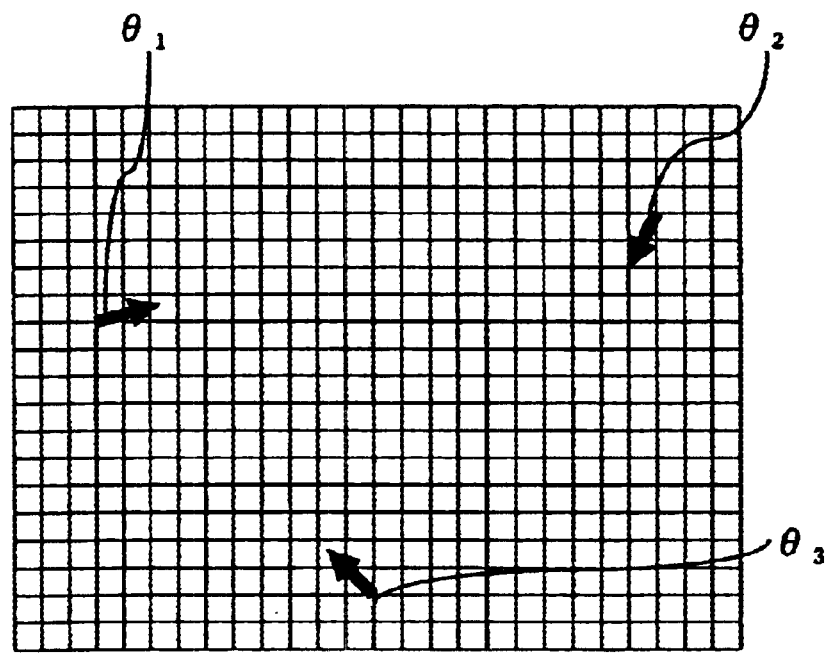
FIG. 9 is an illustration representing an inclination computation function.

The inclination computation function to be performed by the inclination computation processing section 70 will now be described by reference to FIGS. 8 and 9. FIG. 9 is an illustration representing an inclination computation function.

Arrows shown in FIG. 9 correspond to inclination data ($\theta_1$, $\theta_2$, $\theta_3$), each data set representing the inclination of a straight line. Inclination data $\theta_1$ is identified as being present in line with angle data sets ($\theta_{11}$, $\theta_{12}$, $\theta_{13}$, $\theta_{14}$) shown in FIG. 8 and corresponds to an arithmetical mean of the angle data sets. Inclination data $\theta_2$ is identified as being present in line with angle data sets ($\theta_{21}$, $\theta_{22}$, $\theta_{23}$, $\theta_{24}$) shown in FIG. 8 and corresponds to an arithmetical mean of the angle data sets. Inclination data $\theta_3$ is identified as being present in line with angle data sets ($\theta_{31}$, $\theta_{32}$, $\theta_{33}$, $\theta_{34}$) shown in FIG. 8 and corresponds to an arithmetical mean of the angle data sets.

A criterion for determining whether or not angle data sets are belong to an identical line is whether the difference between the angle data sets determined by means of the approximation method shown in FIG. 7 is within two markings or not. When the difference is determined to be within two markings, those angle data sets are taken as being in an identical line.

In the sign perception system according to the present embodiment, the inclination of a straight line is not determined directly, as mentioned previously. There are determined angle data corresponding to the inclinations of line segments located in a single line. An arithmetical mean of the angle data sets is taken as the incline of a straight line. The reason why such a method is employed is that when any one of sign shown in FIGS. 10 through 12 is entered by way of a plane corresponding to illustratively a 29-inch screen, tests show that the game player's finger traces a distorted line. Therefore, in order to enable the sign perception system to perceive a distorted line or curve, there are obtained the inclinations of line segments constituting a straight line before computation of the inclination of the straight line.

The verification processing function of the verification processing section 90 will now be described. As mentioned previously, a verification operation involves checking of inclination data against template data and specification of magic corresponding to the matched template data.

For example, provided that template data are (e, 4, a) and that inclination data comprise (e, 4, a), (e, 3, a), (f, 5, b), and (e, 6, a), only the inclination data (e, 6, a) is determined not to match the template data (e, 4, a). The remaining inclination data sets deviate 22.5° or less from the case data, whereas only the inclination data (e, 6, a) deviates 45° or more from the template data. Thus, verification of a vaguely-input sign can be implemented.

The sign perception system according to the present embodiment has the foregoing configuration and can perceive a sign intended by the game player from the received-light pattern data corresponding to the motion of a finger or hand of the game player.

Figure 14:
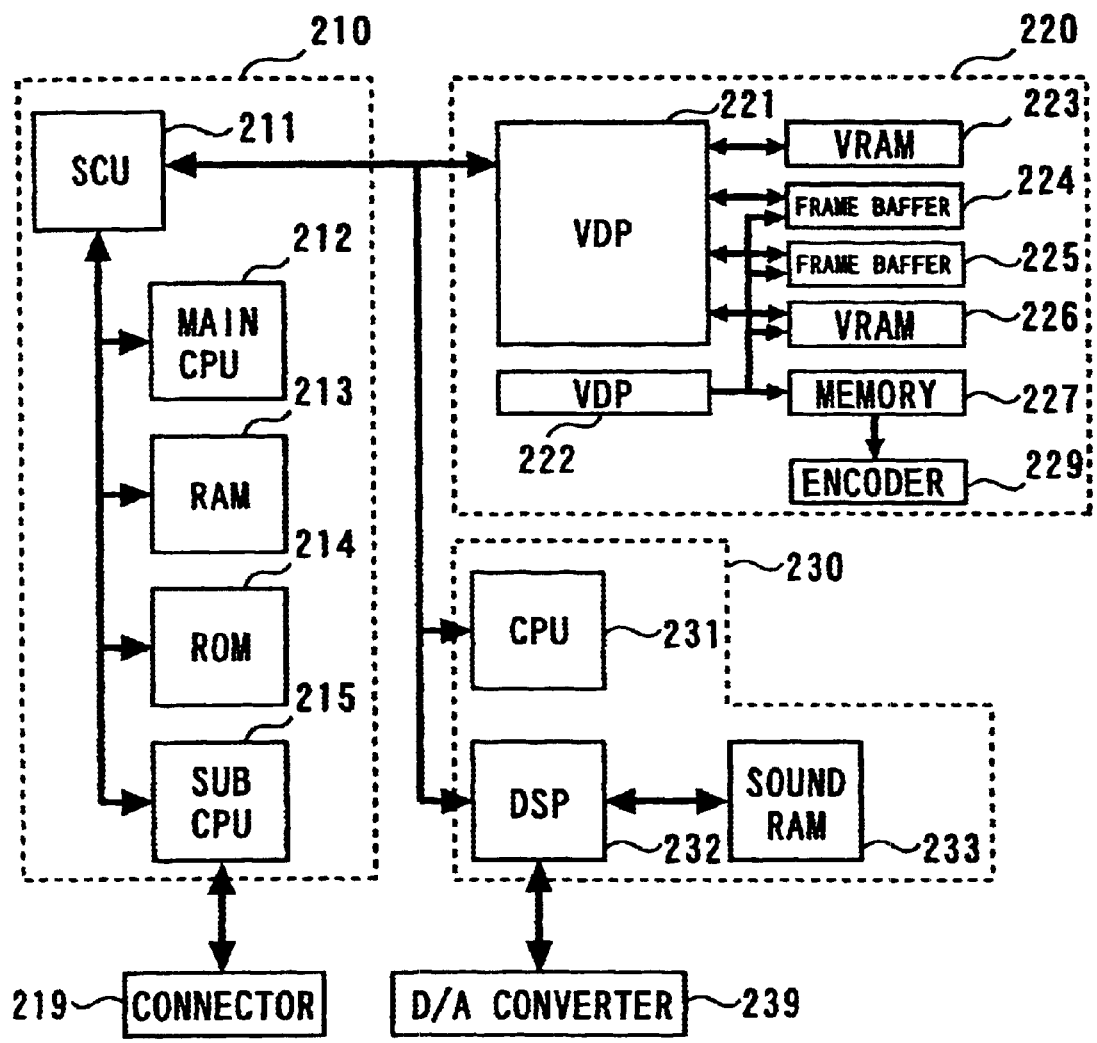
FIG. 14 is a block diagram showing a game control board constituting the game system according to the embodiment of the present invention.

The configuration of a game system according to the present embodiment will be described by reference to FIG. 14. FIG. 14 is a block diagram showing a game control board constituting the game system according to the embodiment.

The game system schematically comprises a CPU block 210, a video block 220, and a sound block 230.

The CPU block 210 is an image output or control circuit for executing a game by means of execution of a program. The CPU block 210 comprises a system control unit (SCU) 211, a main CPU 212, RAM 213, ROM 214, and a sub CPU 215. Individual sections of the CPU block 210 will now be described.

The SCU 211 is arranged so as to be able to control transfer of data by way of a bus. The SCU 211 has a built-in DMA controller and enables transfer, to VRAM 223 provided in the video block, of image data which are required by a game being executed and stored in the RAM 213. Further, the SCU 211 enables transfer of PCM data to the sound block 230.

The main CPU 212 implements a game control function and has a built-in digital signal processor (DSP). The main CPU 212 performs processing at high speed on the basis of program data.

The RAM 213 stores an application program or other application software programs for implementing the sign perception system described in connection with FIGS. 4 through 9. The RAM 213 acts as the coordinate data memory 40, the angle data memory 60, the inclination data memory 80, or the template data memory 100. The ROM 214 stores initial program data to be used for initializing the game system.

The sub CPU 215 is a processor for capturing data or a command from an input device such as a joystick or controller and is connected to the input device by way of a connector 219. In the embodiment, the sub CPU 215 is connected to an I/O board of the received-light pattern detection apparatus 10 described in connection with FIGS. 1 through 3.

The video block 220 outputs an image in accordance with execution of a game on the basis of a control operation performed by a game player by way of operation means. The video block 220 comprises the VDPs (Video Display Processor) 221 and 222, VRAM device 223, frame buffers 224 and 225, VRAM 226, and memory 227. Individual sections of the video block 220 will be described hereinbelow.

The VRAM 223 stores a rendering command and image data, which have been transferred by the main CPU 212 by way of the SCU 211.

The VDP 221 performs arrangement or selection of bitmapped image data in accordance with the rendering command stored in the VRAM 223 or generation of bitmapped data from polygon data. The VDP 221 performs deformation of a graphic and a color computing operation such as shading. The image data generated by the VDP 221 are written into the frame buffers 224 and 225. The VRAM 226 stores a background image, and the VDP 222 stores a data table required for implementing functions.

On the basis of the image data stored in the VRAM 226 and the frame buffers 224 and 225, the VDP 222 performs image processing operations, such as a shading operation, a zooming operation, a rotation operation, a Mosaic processing operation, a movement operation, and a hidden surface elimination operation such as a clipping operation or a display prioritization operation. The VDP 222 stores display screen data into the memory 227.

The memory 227 stores rendering image data output from the VDP 221 and outputs the data to an encoder 229.

The encoder 229 converts the rendering image data stored in the memory 227 so as to comply with the format of a video signal. The thus-converted data are subjected to digital-to-analog conversion in a digital-to-analog converter 239, and the thus-converted analog data are supplied to the CRT monitor 1. The CRT monitor 1 displays an image on the basis of the supplied video signal.

The sound block 230 produces sound assigned to an image to be output from the video block 220. The sound block 230 comprises a DSP 232. a CPU 231, and sound RAM 233. Individual sections of the sound block 230 will now be described.

The CPU 231 transfers to the DSP 232 the PCM data transferred from the RAM 213 from the main CPU 212.

On the basis of the PCM data, the DSP 232 performs generation of a wave from a PCM sound source or an FM sound source, generation of delayed data, and a voice synthesis operation. The DSP 232 outputs the thus-produced waveform data to the digital-to-analog converter 239. The DSP 232 has functions, such as a frequency control function, a volume control operation, an FM playing function, a modulating function, a voice synthesis function. and a reverberation function.

The sound RAM 233 preserves PCM data. The CPU 231 can access the sound RAM 233, and the main CPU 212 can make direct access to the sound RAM 233. The sound RAM 233 stores PCM data while separating the data in two buffers. During a period of time in which the main CPU 212 accesses one of the buffers or writes new PCM data into the buffer, the CPU 231 can produce sound by means of reading PCM data from the other buffer.

Here, the "PCM data" correspond to recorded quantumized waveform values which vary with time. Music or effective sound is produced from the PCM data.

The digital-to-analog converter 239 converts the waveform data produced by the DSP 232 into a two-channel signal and supplies the two-channel signal to speakers. Up to this point the outline of configuration of the game control board according to the present embodiment has been described.

The game system according to the present embodiment has the foregoing configuration and can perceive a sign intended by a game player from the motion of a finger or hand of the player and control the operations of game characters or the situation of a game in accordance with the sign.

A computer program concerning the foregoing game may be recorded on, for example, a recording medium for use with a game machine for home use. Delivering such a recording medium falls within the scope of the present invention. The recording medium covers magnetic tapes, flexible disks, optical disks such as CD-ROM or DVD, and optical magnetic disks such as MO.

As has been described, the present invention can provide a game system which perceives a sign intended by a game player from the motion of a finger or hand of the player and controls the motions of game characters or the situation of a game in accordance with the sign, a sign perception system for use with the game system, and a computer-readable recording medium having a game program recorded thereon.

Further, the present invention is not limited to these embodiments, but variations and modifications may be made without departing from the scope of the present invention.

The entire disclosure of Japanese Patent Application No. Hei 11-330926 filed on Nov. 22, 2000 including specification, claims, drawings and summary are incorporated herein by reference in its entirety.

What is claimed is:

1. A game system for controlling a game in accordance with a motion of a game player, comprising:

received-light pattern detection means for detecting the motion of the game player's hand as a received-light pattern;

sign perception means for perceiving a sign from the received-light pattern input from the received-light pattern detection means; and game control means for controlling a game in accordance with the sign perceived by the sign perception means wherein said sign perception means includes a coordinate determination processing section for determining coordinates from the received-light pattern data;

an inclination computation processing section for detecting a straight line from the coordinate data determined by the coordinate determination processing section, thereby computing the inclination of the straight line; and a verification processing section for perceiving a sign by means of checking the inclination data computed by the inclination computation section against template data.

2. A computer-readable recording medium having recorded thereon a program for controlling a game in accordance with a motion of a game player and causing a computer to perform a sign perception function for perceiving a sign from a received-light pattern corresponding to the motion of a hand of the game player; and a game control function for controlling a game in accordance with the sign perceived by the sign perception function wherein said sign perception function includes
- a coordinate determination function for determining coordinates from the received-light pattern data;
- an inclination computation function for computing an inclination of a straight line from the coordinate data determined by the coordinate determination function; and
- a verification function for perceiving a sign by means of checking the inclination data computed by the inclination computation function against template data.

3. A sign perception system for perceiving a sign from received-light pattern data, comprising:
- a coordinate determination processing section for determining coordinates from the received-light pattern data;
- an inclination computation processing section for detecting a straight line from the coordinate data determined by the coordinate determination processing section, thereby computing the inclination of the straight line; and
- a verification processing section for perceiving a sign by means of checking the inclination data computed by the inclination computation section against template data.

4. A sign perception system for perceiving a sign from received-light pattern data, comprising:
- a coordinate determination processing section for determining coordinates from the received-light pattern data;
- a data selection processing section for selecting the coordinate data determined by the coordinate determination section;
- an angle computation processing section for computing angle data from the coordinate data selected by the data selection processing section;
- an inclination computation processing section for detecting a straight line from the angle data computed by the angle computation processing section, thereby computing the inclination of the straight line; and
- a verification processing section for perceiving a sign by means of checking the inclination data computed by the inclination computation section against template data.

5. A computer-readable recording medium having recorded thereon a program for perceiving a sign from received-light pattern data and causing a computer to perform
- a coordinate determination function for determining coordinates from the received-light pattern data;
- an inclination computation function for computing an inclination of a straight line from the coordinate data determined by the coordinate determination function; and
- a verification function for perceiving a sign by means of checking the inclination data computed by the inclination computation function against template data.

6. A game system for controlling a game in accordance with a motion of a game player, comprising:
- received-light pattern detection means for detecting the motion of the game player's hand as a received-light pattern;
- sign perception means for perceiving a sign from the received-light pattern input from the received-light pattern detection means; and
- game control means for controlling a game in accordance with the sign perceived by the sign perception means wherein said game control means includes
- target detecting means for detecting a target specified by the game player's hand; and
- attacking means for attacking the target in a way specified by the sign.

7. A computer-readable recording medium having recorded thereon a program for controlling a game in accordance with a motion of a game player and causing a computer to perform
- a sign perception function for perceiving a sign from a received-light pattern corresponding to the motion of a hand of the game player; and
- a game control function for controlling a game in accordance with the sign perceived by the sign perception function wherein said game control function includes
- target detecting function for detecting a target specified by the game player's hand; and
- attacking function for attacking the target in a way specified by the sign.

* * * * *